United States Patent
Li (10) Patent No.: US 8,983,528 B2
(45) Date of Patent: Mar. 17, 2015

(54) DEVICE AND METHOD FOR DISCONNECTING DOWNLOAD CHANNEL OF HAND-HELD TERMINAL

(75) Inventor: Chunyu Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 149 days.

(21) Appl. No.: 13/258,733

(22) PCT Filed: May 18, 2010

(86) PCT No.: PCT/CN2010/072881
§ 371 (c)(1),
(2), (4) Date: May 10, 2012

(87) PCT Pub. No.: WO2010/148834
PCT Pub. Date: Dec. 29, 2010

(65) Prior Publication Data
US 2012/0244906 A1 Sep. 27, 2012

(30) Foreign Application Priority Data
Nov. 11, 2009 (CN) .......................... 2009 1 0221635

(51) Int. Cl.
*H04M 1/00* (2006.01)
*H04W 88/02* (2009.01)
(Continued)

(52) U.S. Cl.
CPC ............ *H04W 88/02* (2013.01); *H04W 88/021* (2013.01); *H04W 88/04* (2013.01); *H04M 1/72519* (2013.01)
USPC ...... 455/550.1; 455/572; 455/573; 455/575.1; 379/110.01

(58) Field of Classification Search
CPC .... H04W 88/02; H04W 88/021; H04W 88/04
USPC ............................. 455/550.1, 572, 573, 575.1
See application file for complete search history.

(56) References Cited

U.S. PATENT DOCUMENTS

| 6,711,684 B1 * | 3/2004 | Moroney et al. ............... 713/191 |
| 2004/0204021 A1 | 10/2004 | Cocita |

(Continued)

FOREIGN PATENT DOCUMENTS

| CN | 1768521 A | 5/2006 |
| CN | 1790290 A | 6/2006 |

(Continued)

OTHER PUBLICATIONS

International Search Report in international application No. PCT/CN2010/072881, mailed on Sep. 2, 2010.

(Continued)

*Primary Examiner* — Khalid Shaheed
(74) *Attorney, Agent, or Firm* — Oppedahl Patent Law Firm LLC (57) ABSTRACT

The disclosure provides a device and method for disconnecting a download channel of a hand-held terminal. The device comprises: a connection/disconnection unit (308), which comprises a fuse module (308-2) and a fusing module (308-4), arranged between a download connection point (302) and a microprocessor (306); when no downloading is needed by the hand-held terminal, the fusing module (308-4) is provided with a level signal through the download connection point, and switch characteristics of a triode or an MOSFET in the fusing module (308-4) are utilized, to control the connection/disconnection of the download channel between the download connection point (302) and the microprocessor (306), thus avoiding generation of new download channel.

7 Claims, 5 Drawing Sheets

(51) Int. Cl.
*H04W 88/04* (2009.01)
*H04M 1/725* (2006.01)

(56) References Cited

U.S. PATENT DOCUMENTS

| | | | | |
|---|---|---|---|---|
| 2005/0113054 | A1* | 5/2005 | Lee | 455/270 |
| 2008/0106476 | A1* | 5/2008 | Tran et al. | 343/702 |
| 2008/0275965 | A1 | 11/2008 | Torimoto | |
| 2010/0328987 | A1* | 12/2010 | Liu et al. | 365/96 |

FOREIGN PATENT DOCUMENTS

| | | |
|---|---|---|
| CN | 101026834 A | 8/2007 |
| CN | 101146295 A | 3/2008 |
| EP | 1128242 A2 | 8/2001 |
| EP | 1256865 A2 | 11/2002 |
| EP | 1918808 A2 | 5/2008 |
| JP | H11177682 A | 7/1999 |
| WO | 9815082 A1 | 4/1998 |
| WO | 9843212 A1 | 10/1998 |
| WO | 0075759 A1 | 12/2000 |
| WO | 2005069591 A1 | 7/2005 |

OTHER PUBLICATIONS

English Translation of the Written Opinion of the International Search Authority in international application No. PCT/CN2010/072881, mailed on Sep. 2, 2010.

Supplementary European Search Report in European application No. 10791340.2, mailed on Jun. 3, 2014.

* cited by examiner

DEVICE AND METHOD FOR DISCONNECTING DOWNLOAD CHANNEL OF HAND-HELD TERMINAL

TECHNICAL FIELD

The disclosure relates to the field of the download of a hand-held terminal, and in particular to a device and method for disconnecting download channel of a hand-held terminal.

BACKGROUND

As mature and development of electronic technology, hand-held terminals such as mobile phones become more and more popular, which brings great convenience for communication of people and meets the society requirements with fast pace and high-efficiency. In order to develop subscribers better, some mobile operators provide hand-held terminals for subscribers at low prices or for free, however, at the same time, the mobile operators require such hand-held terminals to bind themselves to networks of the mobile operators or lock themselves to Subscriber Identity Module (SIM) cards of the mobile operators, that is, so called network locking and card locking.

Generally, for hand-held terminals with network locking or card locking function, it is determined whether the current SIM card used by the hand-held terminal meets the requirement of network locking or card locking according to the International Mobile Subscriber Identity (IMSI) in the SIM card. Specifically, the basic principle of network locking or card locking is as follows: if the IMSI numbers meet the requirement of the mobile operator, the hand-held terminal is allowed to work normally; otherwise, the user is refused to use the hand-held terminal. Herein, there are total 15 numbers in the IMSI, the structure of which is MCC number+MNC number+MIN number, wherein there are 3 numbers for the Mobile Country Code (MCC); and there are 2 numbers for the Mobile Network Code (MNC).

However, at present, someone utilize the download channels of the hand-held terminals to illegally rewrite codes or date of the memories of the hand-held terminals, and to decode hand-held terminals to make the hand-held terminals lose network locking or card locking function, which makes mobile operators and hand-held terminal manufactures suffer huge losses. Therefore, it is required that hand-held terminals must be able to effectively prevent from being utilized to downloaded data illegally.

Figure 1:
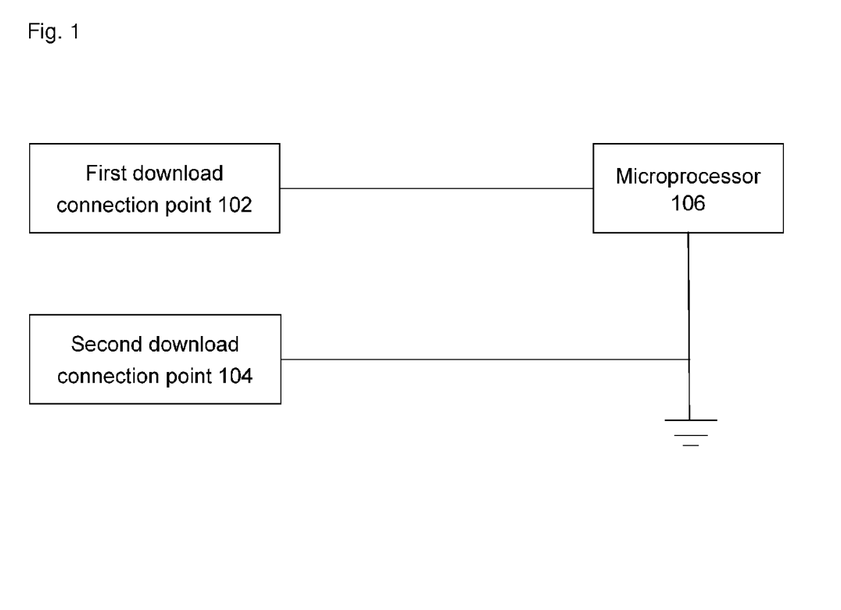
FIG. 1 shows a schematic diagram illustrating that a first download connection point is connected with a microprocessor through wires in the prior art.

In the prior art, the download circuit of a hand-held device is generally as shown in FIG. 1, including: a first download connection point 102, a second download connection point 104 and a microprocessor 106; wherein the first download connection point 102 is connected with the microprocessor 106 through a wire, and the second download connection point 104 is connected with a battery cathode of the hand-held device. When it is required to download data, a data signal is loaded between the first download connection point 102 and the second download connection point 104, such that data is downloaded to the hand-held terminal. Generally, when the hand-held terminal user uses the hand-held terminal normally, it is unnecessary to download data for the hand-held terminal; therefore, the download circuit as shown in FIG. 1 has the following main defects: when no data needs to be downloaded by the hand-held terminal, the first download connection point 102 is still connected with the microprocessor 106, which may cause generation of illegal download.

Figure 2:
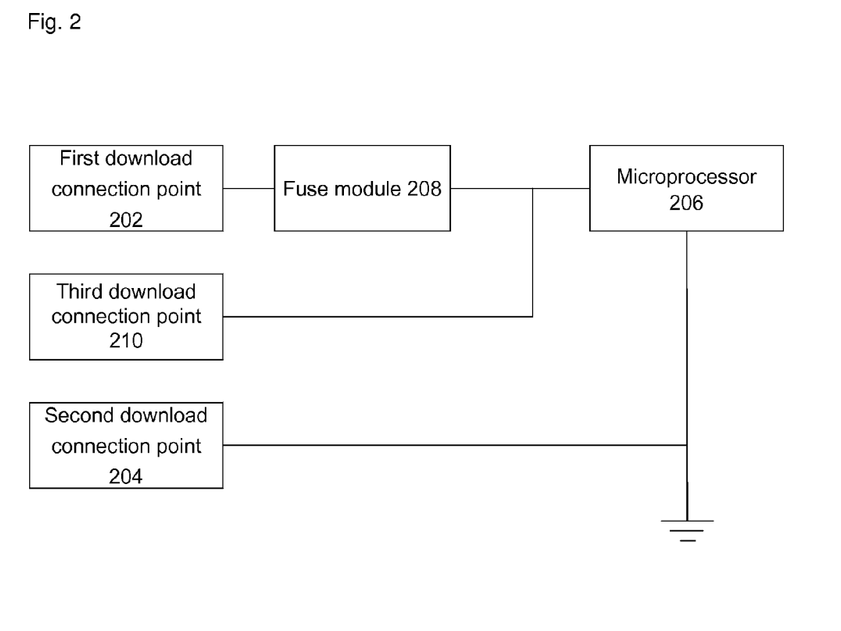
FIG. 2 shows a schematic diagram of fusing a fuse by introducing a third download connection point in the prior art.

In order to solve above technical problem, a technical solution is provided: a fuse module is added between the first download connection point and the microprocessor, when the hand-held terminal is outgoing from the factory, the fuse in the fuse module is fused, to achieve the purpose of disconnecting the download channel between the first download connection point and the microprocessor. FIG. 2 shows a diagram of fusing the fuse by introducing an additional download connection point, as shown in FIG. 2, a fuse module 208 is connected in series between the first download connection point 202 and the microprocessor 206, at the same time, a third download connection point 210 is introduced at one end where the fuse module 208 is connected with the microprocessor, the third download connection point 210 is used for providing a voltage required to fuse the fuse.

During process of producing a hand-held terminal by a manufacture, the fuse in the fuse module 208 is connected with the first download connection point 202 and the microprocessor 206, such that normal download can be executed, however, when the hand-held terminal is outgoing from the factory, a proper voltage is added between the first download connection point 202 and the third download connection point 210, in this case, current flows through the fuse to make the fuse fused, such that the purpose of disconnecting the download circuit is realized. However, this solution also has defect that, as the third download connection point 210 is still connected with the microprocessor 206 through the wire, it is possible to download illegal data for the hand-held terminal through the third download connection point 210.

SUMMARY

Therefore, the disclosure mainly aims to provide a device and method for disconnecting download channel of a hand-held terminal, so as to solve the problem that the download channel is always communicated and is easily utilized to download data illegally in the existing download circuit.

In order to solve above problem, the technical solution of the disclosure is realized as follows:

a device for disconnecting a download channel of a hand-held terminal includes: a first download connection point, a second download connection point and a microprocessor; the device further includes a connection/disconnection unit connected between the first download connection point and the microprocessor;

the connection/disconnection unit is configured to control connection/disconnection of a connection between the first download connection point and the microprocessor by controlling fusing of a fuse;

the second download connection point, the microprocessor and one end of the connection/disconnection unit are connected with a battery cathode of the hand-held terminal.

The connection/disconnection unit may include a fuse module and a fusing module, wherein the fuse module may be configured to fuse the fuse according to control of the fusing module;

the fusing module may be configured to control whether to fuse the fuse in the fuse module.

Both the fuse module and the fusing module may be connected between the first download connection point and the microprocessor.

The device may further include a third download connection point;

the fuse module may be connected between the first download connection point and the microprocessor;

the fusing module may be connected between the third download connection point and the microprocessor.

The first download connection point, the second download connection point and the third download connection point may all are metal connection pieces on a connector of the hand-held terminal or test points on a mainboard.

The fusing module may include a triode and a resistor; the triode may be a PNP-typed or NPN-typed triode; or the fusing module may include an MOSFET and a resistor; the MOSFET may be an NMOS-typed or PMOS-typed MOSFET.

A method for disconnecting a download channel of a hand-held terminal is provided, wherein a connection/disconnection unit is arranged between a download connection point and a microprocessor; the method further includes:

when no downloading is needed by the hand-held terminal, a fusing module is provided with a level signal through the download connection point, to control connection/disconnection of the download channel between the download connection point and the microprocessor.

Controlling the connection/disconnection of the download channel between the download connection point and the microprocessor may be realized by a fuse module and a fusing module which are arranged in the connection/disconnection unit; wherein the fusing module may control whether to fuse a fuse in the fuse module, and the fuse module may execute an operation of whether to fuse the fuse according to the control of the fusing module.

The download connection point providing the level signal for the fusing module may be an additional download connection point or original download connection point.

The fusing module may include a triode and a resistor; the triode may be a PNP-typed or NPN-typed triode; or the fusing module may include an MOSFET and a resistor; the MOSFET may be an NMOS-typed or PMOS-typed MOSFET.

The device and the method for disconnecting download channel of a hand-held terminal in the disclosure is characterized in that a connection/disconnection unit, which includes a fuse module and a fusing module, is arranged between a download connection point and a microprocessor; when no downloading is needed by the hand-held terminal, the fusing module is provided with a level signal through the download connection point, and switch characteristics of a triode or an MOSFET in the fusing module are utilized to control the connection or disconnection of the download channel between the download connection point and the microprocessor, thus avoiding generation of a new download channel. Due to presence of the triode or MOSFET in the fusing module, no new download channel is generated no matter the fusing module is provided with a level signal by the additional download connection point or original download connection point, thus the problem that the hand-held terminal is utilized to download data illegally is avoided. In this way, the purpose of preventing illegal download is achieved, and the network locking or card locking function of the hand-held terminal is protected effectively.

BRIEF DESCRIPTION

DETAILED DESCRIPTION

The basic concept of the disclosure is as follows: a connection/disconnection unit, which includes a fuse module and a fusing module, is arranged between a download connection point and a microprocessor; the fusing module is provided with a level signal through the download connection point, to control the connection/disconnection of the download channel between the download connection point and the microprocessor, thereby avoiding generation of new download channels, and further preventing the hand-held terminal from being utilized to download data illegally.

Herein, the download connection point providing the level signal to the fusing module is an additional download connection point or original download connection point, such as a first download connection point. The fusing module consists of a triode and a resistor or consists of an MOSFET and a resistor; wherein the triode may be a PNP-typed or NPN-typed triode, and the MOSFET may be an NMOS-typed or PMOS-typed MOSFET; the control of the connection/disconnection of the download channel specifically refers to that switch characteristics of the triode or the MOSFET are utilized to control the connection/disconnection of the download channel.

The realization of the disclosure will be described in details below with reference to drawings in conjunction with embodiments.

Embodiment 1

In the embodiment, the fusing module in the connection/disconnection unit is provided with a level signal by the first download connection point; the fusing module consists of an NPN-typed triode and a resistor.

Figure 3:
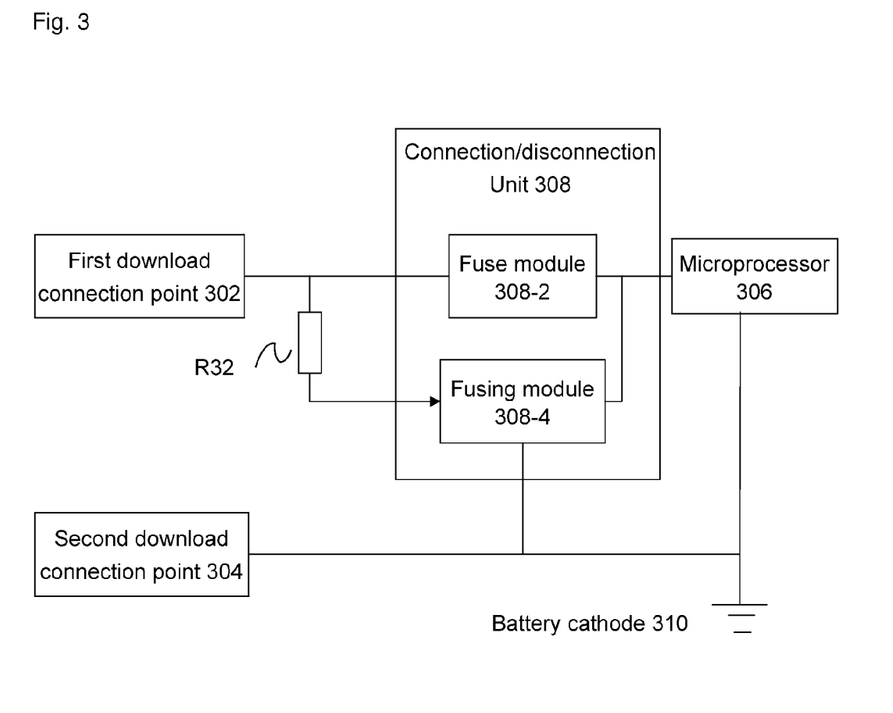
FIG. 3 shows a schematic diagram of a device for disconnecting the download channel of a hand-held terminal according to Embodiment 1 of the disclosure.

FIG. 3 shows a schematic diagram of a device for disconnecting the download channel of a hand-held terminal according to Embodiment 1 of the disclosure, as shown in FIG. 3, the device includes a first download connection point 302, a second download connection point 304, a microprocessor 306 and a connection/disconnection unit 308; wherein the first download connection point 302 is configured to provide a data signal for the microprocessor and provide a level signal for the fusing module 308-4 in the connection/disconnection unit 308 during process of downloading; the second download connection point 304 is configured to provide the fuse module a voltage required to fuse the fuse together with the first download connection point 302; the microprocessor 306 is connected with the first download connection point 302 through wires and configured to receive the data signal from the first download connection point during process of downloading; the connection/disconnection unit 308, including a fuse module 308-2 and a fusing module 308-4, is connected through wires in series between the first download connection point 302 and the microprocessor 306, and configured to control the connection/disconnection of the connection between the first download connection point 302 and the microprocessor 306; the second download connection point 304, the microprocessor 306 and the connection/disconnection unit 308 are all connected with a battery cathode 310 of the hand-held terminal.

Wherein the fuse module 308-2 is configured to fuse the fuse according to the control of the fusing module 308-4 in order to connect or disconnect the channel between the first download connection point 302 and the microprocessor 306, the fuse module 308-2 has two ports connected with the first download connection point 302 and the microprocessor 306 respectively, when the current flowing through the fuse in the fuse module 308-2 exceeds the maximum current that can be withstood by the fuse, the fuse will be fused, the channel between the first download connection point 302 and the microprocessor 306 will be disconnected;

the fusing module 308-4 is configured to control whether to fuse the fuse in the fuse module 308-2, the fusing module 308-4 has three ports connected with an interface through which the level signal is provide for the fusing module 308-4, a battery cathode 310 of the hand-held terminal and a port of the fuse module 308-2, respectively.

As shown in FIG. 3, the fuse module 308-2 is connected with the microprocessor 306 through wires; the fusing module 308-4 is connected with the microprocessor 306 and the battery cathode 310 of the hand-held terminal through wires, and a resistor R32 is connected through wires in series between the first download connection point 302 and the fusing module 308-4.

In the embodiment, as an original download connection point, the first download connection point 302 will provide a level signal for the fusing module 308-4. If a data signal is loaded between the first download connection point 302 and the second download connection point 304, when data is downloaded for the hand-held terminal, the level of the first download connection point 302 will change between a high level and a low level, however, no matter whether the first download connection point 302 is in high level or low level, the fusing module 308-4 will not be turned on, in this way, it is guaranteed that the fuse will not be fused.

When it is needed to fuse the fuse, a proper voltage is added between the first download connection point 302 and the second download connection point 304 to turn on the fusing module 308-4, in this way, there is a current flowing through the fuse module 308-2 to make the fuse in the fuse module 308-2 fused.

Figure 4:
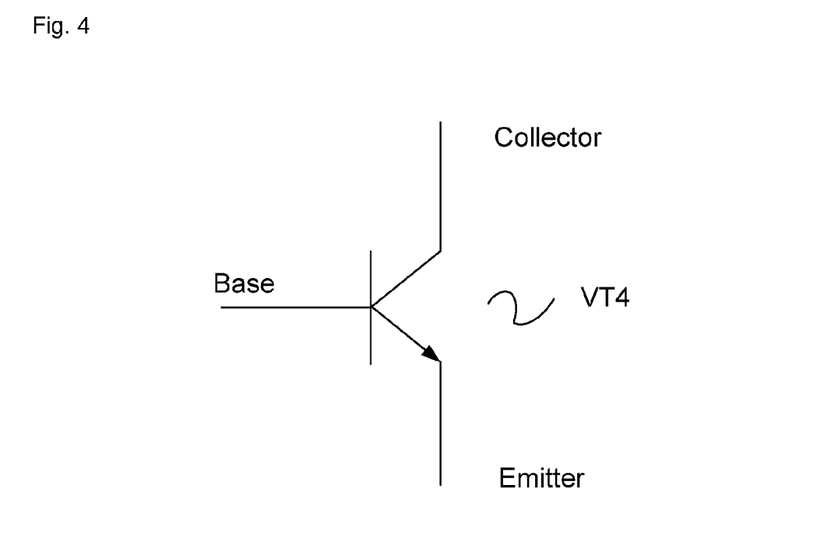
FIG. 4 shows a schematic diagram of an NPN-typed triode.

The fusing module may consist of a resistor and an NPN-typed triode, FIG. 4 shows a schematic diagram of an NPN-typed triode. The NPN-typed triode as shown in FIG. 4 can withstand impact of a large current required to fuse the fuse, when the difference between the voltage of the base of the triode and the voltage of the emitter thereof is less than 0.3V, the collector and the emitter are not conductive, such that the current required to fuse the fuse can not flow through; when the difference between the voltage of the base of the triode and the voltage of the emitter thereof is more than 0.7V, the collector and the emitter are conductive, such that the current required to fuse the fuse can flow through.

In the preferred embodiment, an additional resistor is introduced, such as the resistor R32, the fusing module is directly provided with a level signal by the first download connection point to turn on the fusing module, such that the current can flow through the fuse module, in this way, the device needs no additional download connection point, such as a third download connection point, to fuse the fuse. Thus, the problems that the download channel is always communicated and is easily utilized to download data illegally in the existing hand-held terminal.

Figure 5:
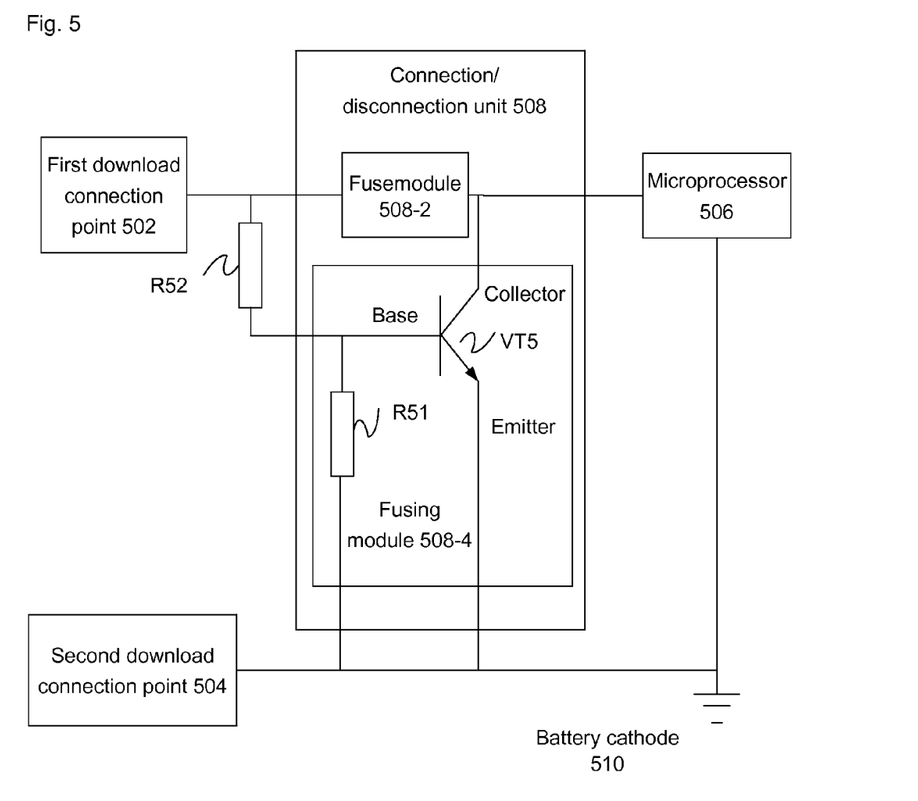
FIG. 5 shows a schematic diagram of the specific circuit of the device as shown in FIG. 3.

FIG. 5 shows a schematic diagram of the specific circuit of the device as shown in FIG. 3, as shown in FIG. 5, the fusing module consists of a resistor R51 and an NPN-typed triode VT5, and a resistor R52 is connected through wires in series between the first download connection point 502 and a fusing module 508-4.

During production of a hand-held terminal, a data signal is loaded between the first download connection point 502 and the second download connection point 504, when data is downloaded for the hand-held terminal, the level of the first download connection point 502 will change between a high level and a low level.

It is assumed herein that the resistance value of R51 is 1K ohm and the resistance value of R52 is 15K ohm; the high level of the first download connection point 502 is 2.8V and the low level thereof is 0V.

When the first download connection point 502 is in the high level 2.8V, through dividing the voltage between the resistors R51 and R52, the voltage obtained by the base of the triode VT5 is 0.175V, the difference between the voltage of the base of the triode VT5 and the voltage of the emitter thereof is 0.175V, which is less than 0.3V, therefore the collector and the emitter of the triode VT5 are not conductive, such that the current required to fuse the fuse cannot flow through.

When the first download connection point 502 is in the low level 0V, through dividing the voltage between the R51 and R52, the voltage obtained by the base of the triode VT5 is 0V, the difference between the voltage of the base of the triode VT5 and the voltage of the emitter thereof is 0V, which is less than 0.3V, therefore the collector and the emitter of the triode VT5 are not conductive, such that the current required to fuse the fuse cannot flow through.

Therefore, no matter whether the first download connection point 502 is in a high level or low level, the fuse will not be fused, such that the hand-held terminal can perform downloading normally.

When it is needed to fuse the fuse, a proper voltage, such as 16V, is added between the first download connection point 502 and the second download connection point 504, through dividing the voltage between the resistors R51 and R52, the voltage obtained by the base of the triode VT5 is 1V, the difference between the voltage of the base of the triode VT5 and the voltage of the emitter thereof is 1V, which is more than 0.7V, the collector and the emitter of the triode VT5 are conductive, such that the current required to fuse the fuse can flow through. In this case, the 16V-voltage at the two ends of the fuse module 508-2 will have an enough current to flow through the fuse module 508-2 in order to make the fuse fused.

Embodiment 2

In the embodiment, the fusing module in the connection/disconnection unit is provided with a level signal by the first download connection point; the fusing module consists of a PNP-typed triode and a resistor.

Figure 6:
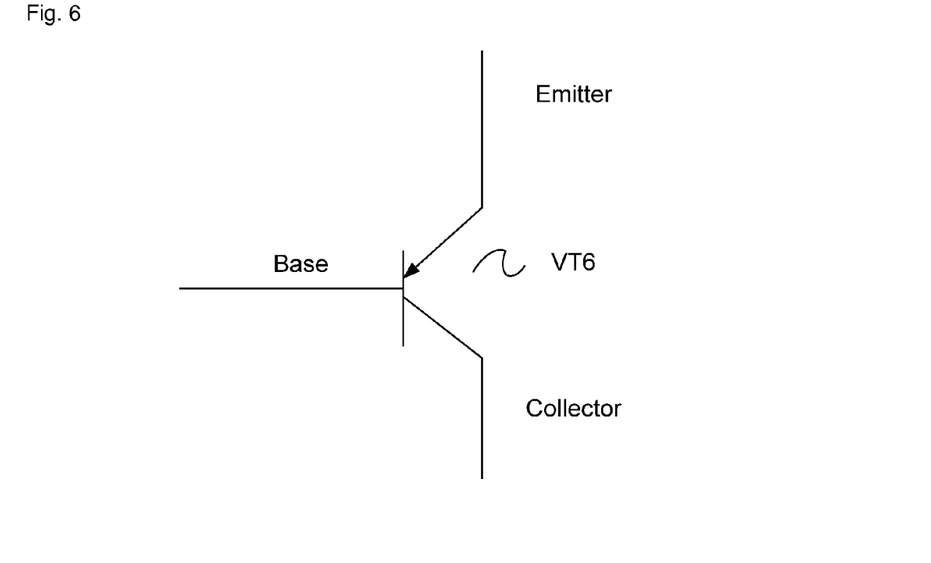
FIG. 6 shows a schematic diagram of a PNP-typed triode.

In the embodiment, the basic structure of the device for disconnecting the download channel of a hand-held terminal is shown in FIG. 3, wherein the fusing module consists of a resistor and a PNP-typed triode, FIG. 6 shows a schematic diagram of the PNP-typed triode.

When the difference between the voltage of the base of the triode VT6 and the voltage of the emitter thereof is less than 0.3V, the collector and the emitter are not conductive, such that the current required to fuse the fuse cannot flow through; when the difference between the voltage of the base of the triode VT6 and the voltage of the emitter thereof is more than 0.7V, the collector and the emitter are conductive, such that the current required to fuse the fuse can flow through.

Figure 7:
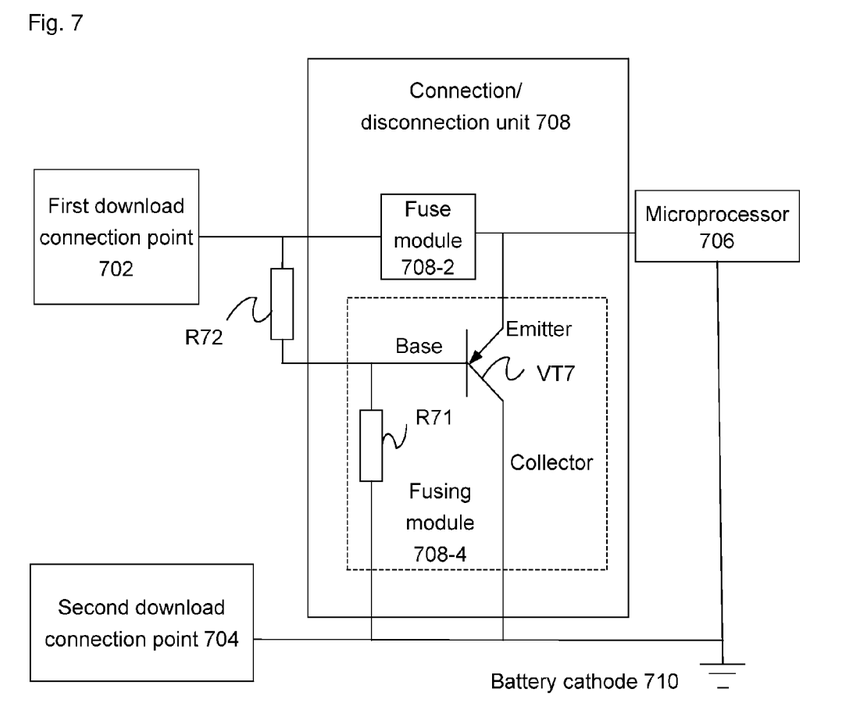
FIG. 7 shows a schematic diagram of the specific circuit of a device for disconnecting the download channel of a hand-held terminal according to Embodiment 2 of the disclosure.

FIG. 7 shows a schematic diagram of the specific circuit of a device for disconnecting the download channel of a hand-held terminal according to Embodiment 2 of the disclosure, wherein the fusing module 708-4 consists of a resistor R71 and a PNP-typed triode VT7, and a resistor R72 is connected through wires in series between the first download connection point 702 and the fusing module 708-4. That is, the fusing module 708-4 is provided with a level signal by the first download connection point 702.

During production of a hand-held terminal, a data signal is loaded between the first download connection point 702 and the second download connection point 704, when data is downloaded by the hand-held terminal, the level of the first download connection point 702 will changes between the high level and low level.

It is assumed herein that the resistance value of R71 is 15K ohm and the resistance value of R72 is 1K ohm; the high level of the first download connection point 702 is 2.8V and the low level thereof is 0V.

When the first download connection point 702 is in the high level 2.8V, through dividing the voltage between the resistors R71 and R72, the voltage obtained by the base of the triode VT7 is 2.625V, the difference between the voltage of the base of the triode VT7 and the voltage of the emitter thereof is 0.175V, which is less than 0.3V, therefore the collector and the emitter of the triode VT7 are not conductive, such that the current required to fuse the fuse cannot flow through.

When the first download connection point 702 s in the low level 0V, through dividing the voltage between the resistors R71 and R72, the voltage obtained by the base of the triode VT7 is 0V, the difference between the voltage of the base of the triode VT7 and the voltage of the emitter thereof is 0V, which is less than 0.3V, therefore the collector and the emitter of the triode VT7 are not conductive, such that the current required to fuse the fuse cannot flow through.

Therefore, when data is downloaded for the hand-held terminal, no matter whether the first download connection point 702 is in the high level or low level, the fuse will not be fused, such that the hand-held terminal can perform downloading normally before it is outgoing from the factory.

When it is needed to fuse the fuse, a proper voltage, such as 16V, is added between the first download connection point 702 and the second download connection point 704, through dividing the voltage between the resistors R71 and R72, the voltage obtained by the base of the triode VT7 is 15V, the difference between the voltage of the base of the triode VT7 and the voltage of the emitter thereof is 1V, which is more than 0.7V, the collector and the emitter of the triode VT7 are conductive, such that the current required to fuse the fuse can flow through. In this case, the 16V-voltage at the two ends of the fuse module 708-2 will have an enough current to flow through the fuse module 708-2 in order to make the fuse fused.

Embodiment 3

In the embodiment, an additional third download connection point is added, the fusing module in the connection/disconnection unit is provided with a level signal by the third download connection point; the fusing module consists of a NPN-typed triode and a resistor.

Figure 8:
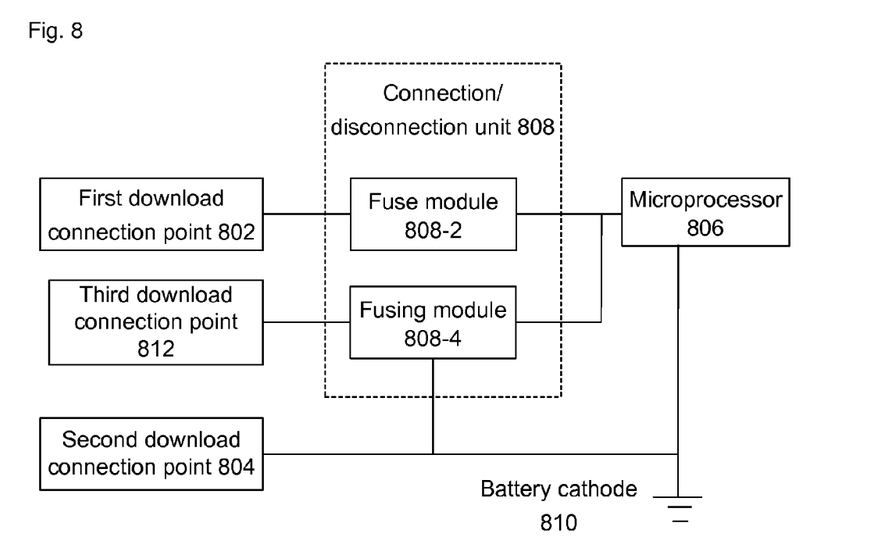
FIG. 8 shows a schematic diagram of a device for disconnecting the download channel of a hand-held terminal according to Embodiment 3 of the disclosure.

FIG. 8 shows a schematic diagram of a device for disconnecting the download channel of a hand-held terminal according to Embodiment 3 of the disclosure, as shown in FIG. 8, in the preferred embodiment, the control of the connection/disconnection of the download channel is realized by arranging a connection/disconnection unit 808 between the first download connection point 802 and the microprocessor 806. Wherein the three ports of the fusing module 808-4 are connected with the third download connection point 812, one port of the fuse module 808-2 and the battery cathode 810 respectively, the third download connection point 812 is configured to provide a level signal for the fusing module 808-4 in the connection/disconnection unit 808. The specific working principle of the device is as follows: when it is needed to download data, no voltage is applied at the two ends of the fuse module 808-2, therefore there is no current flowing through the fuse in the fuse module 808-2 and the fuse will not be fused, as a result, normal data communication can be performed between the first download connection point 802 and the microprocessor 806; when the mobile phone is outgoing from the factory and no data needs to be downloaded, the third download connection point 812 provides a level signal for the fusing module 808-4, the fusing module 808-4 makes the circuit between the first download connection point 802 and the second download connection point 804 conductive, if a certain voltage is applied on the first download connection point 802 and the second download connection point 804, there will be a current flowing through the fuse in the fuse module 808-2, when the current flowing through the fuse reaches the maximum current that can be withstood by the fuse, the fuse will be fused, in this way, the download channel between the first download connection point 802 and the microprocessor 806 is disconnected and cannot be used again, at the same time, as the presence of the fusing module 808-4, the interface providing the level signal, namely, the third download connection point 812, is unable to be communicated with the microprocessor 806, thus the generation of new download channels is prevented, the purpose of preventing the illegal downloading of data is achieved.

Figure 9:
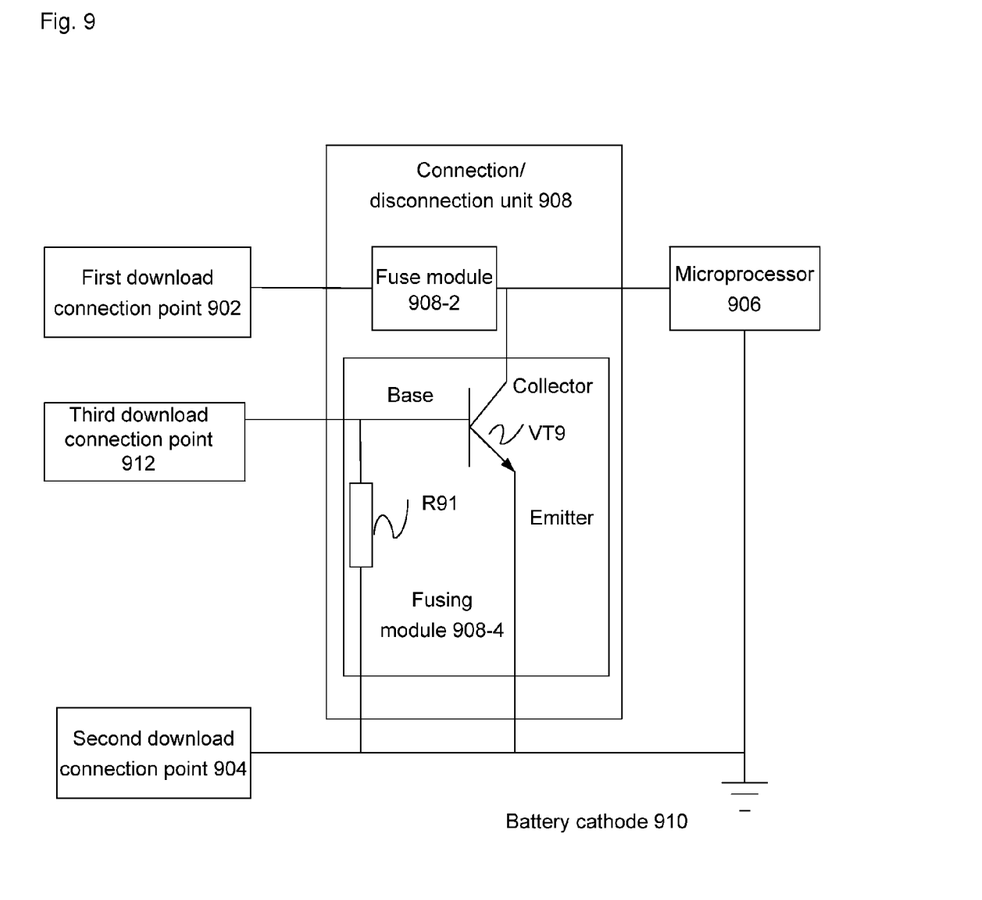
FIG. 9 shows a schematic diagram of the specific circuit of the device as shown in FIG. 8.

FIG. 9 shows a schematic diagram of the specific circuit of the device as shown in FIG. 8, as shown in FIG. 9, the fusing module 908-4 consists of a resistor R91 and an NPN-typed triode VT9. During production of a hand-held terminal, the level of the base of the triode VT9 is pulled to the battery cathode of the hand-held terminal by the resistor R91, that is, 0V, the emitter of the triode VT9 is connected with the battery cathode 910 of the hand-held terminal, that is, also 0V, then the difference between the voltage of the base of the triode VT9 and the voltage of the emitter thereof is 0V, which is less than 0.3V, therefore the collector and the emitter of the triode VT9 are not conductive, such that the current required to fuse the fuse cannot flow through. Therefore, the fuse will not be fused, and the hand-held terminal can perform downloading normally.

When the hand-held terminal is outgoing from the factory, no data needs to be downloaded, in order to prevent illegal download, it is necessary to disconnect the download channel of the hand-held terminal, that is, it is required to fuse the fuse before the hand-held terminal is outgoing from the factory. Firstly, a proper voltage, such as 5V, is added between the first download connection point 902 and the second download connection point 904, then the base of the triode VT9 is provided with a level signal more than 0.7V, such as 1V, through the third download connection point 912, then the difference between the voltage of the base of the triode VT9 and the voltage of the emitter thereof is 1V, which is more than 0.7V, therefore the collector and the emitter of the triode VT9 are conductive, such that the current required to fuse the fuse can flow through. In this case, the 5V-voltage at the two ends of the fuse module 908-2 will make the fuse module 908-2 generate an enough current to make the fuse fused.

For above embodiments, the first download connection point, the second download connection point and the third download connection point may be metal connection pieces on a connector of the hand-held terminal or test points on a mainboard.

Based on the above device, the disclosure further provides a method for disconnecting a download channel of a hand-held terminal, including the following steps.

Step A: a connection/disconnection unit including a fuse module and a fusing module is arranged between a download connection point and a microprocessor;

herein, the fusing module consists of a triode and a resistor or consists of an MOSFET and a resistor; wherein the triode is a PNP-typed or NPN-typed triode; the MOSFET is an NMOS-typed or PMOS-typed MOSFET.

Step B: when no downloading is needed by the hand-held terminal, the fusing module is provided with a level signal through the download connection point, to control the connection/disconnection of the download channel between the download connection point and the microprocessor;

herein, the download connection point providing the level signal to the fusing module may be an additional download connection point or original download connection point; the control is performed by utilizing switch characteristics of a triode or MOSFET.

Specifically, when the hand-held terminal does not need to download data, a certain voltage is applied between the first download connection point and the second download connection point, and the fusing module is provided with a level signal, the circuit between the fusing module and the fuse module will be conductive, that is, a channel will be formed between the first download connection point and the second download connection point through the fuse module and the fusing module; based on the formed channel and the voltage applied on the first download connection point and the second download connection point, there will be a current flowing through the fuse in the fuse module, when the current reaches the maximum current that can be withstood by the fuse, the fuse will be fused, then the download channel between the first download connection point and the microprocessor will be disconnected.

The above embodiments are described by taking the fusing module consisting of a triode and a resistor as example, of course, the function of the fusing module can be realized by replacing the triode with the MOSFET, that is, the NPN-typed triode can be replaced with NMOS-typed MOSFET, or the PNP-typed triode can be replaced with PMOS-typed MOSFET. The working principle and the working way of the fusing module consisting of an MOSFET and a resistor are substantively identical to those of the fusing module consisting of a triode and a resistor, which will not be described here once again.

The above mentioned are only preferred embodiments of the disclosure and are not intended to limit the protection scope of the disclosure; any modifications, equivalent replacements and improvements made within the spirit and principle of the disclosure shall be included within the protection scope of the disclosure.

The invention claimed is:

1. A device for disconnecting a download channel of a hand-held terminal, comprising: a first download connection point, a second download connection point and a microprocessor; the device further comprising:
    a connection/disconnection unit connected between the first download connection point and the microprocessor, which is configured to control connection/disconnection of a connection between the first download connection point and the microprocessor by controlling fusing of a fuse;
    the second download connection point, the microprocessor and one end of the connection/disconnection unit are connected with a battery cathode of the hand-held terminal,
    wherein the connection/disconnection unit comprises a fuse module and a fusing module, wherein the fuse module is configured to fuse the fuse according to the control of the fusing module, and the fusing module is configured to control whether to fuse the fuse in the fuse module, and
    wherein the device further comprises a third download connection point; the fuse module is connected between the first download connection point and the microprocessor; and the fusing module is connected between the third download connection point and the microprocessor.

2. The device according to claim 1, wherein both the fuse module and the fusing module are connected between the first download connection point and the microprocessor.

3. The device according to claim 1, wherein the first download connection point, the second download connection point and the third download connection point all are metal connection pieces on a connector of the hand-held terminal or test points on a mainboard.

4. The device according to claim 1, wherein
    the fusing module comprises a triode and a resistor; the triode is a PNP-typed or NPN-typed triode; or
    the fusing module comprises an MOSFET and a resistor; the MOSFET is an NMOS-typed or PMOS-typed MOSFET.

5. A method for disconnecting a download channel of a hand-held terminal, in which a connection/disconnection unit is arranged between a first download connection point and a microprocessor, a second download connection point, the microprocessor and one end of the connection/disconnection unit are connected with a battery cathode of the hand-held terminal, the method further comprising:
    connecting a fuse module between the first download connection point and the microprocessor,
    connecting the fusing module between a third download connection point and the microprocessor,
    providing the fusing module with a level signal through the third download connection point, when no downloading is needed by the hand-held terminal, to control connection/disconnection of the download channel between the first download connection point and the microprocessor,
    wherein controlling the connection/disconnection of the download channel between the first download connection point and the microprocessor is realized by a fuse module and a fusing module which are arranged in the connection/disconnection unit; wherein the fusing module controls whether to fuse a fuse in the fuse module, and the fuse module executes an operation of whether to fuse the fuse according to the control of the fusing module.

6. The device according to claim 2, wherein
    the fusing module comprises a triode and a resistor; the triode is a PNP-typed or NPN-typed triode; or
    the fusing module comprises an MOSFET and a resistor; the MOSFET is an NMOS-typed or PMOS-typed MOSFET.

7. The method according to claim 5, wherein
    the fusing module comprises a triode and a resistor; the triode is a PNP-typed or NPN-typed triode; or the fusing module comprises an MOSFET and a resistor;
the MOSFET is an NMOS-typed or PMOS-typed MOSFET.

* * * * *